Nov. 21, 1939.  W. L. FISCHER  2,180,351
TORSIONAL VIBRATION DAMPER
Filed Jan. 5, 1938  2 Sheets-Sheet 1

INVENTOR
WILLIAM L. FISCHER
BY
Ransom K. Davis
ATTORNEY

Nov. 21, 1939.   W. L. FISCHER   2,180,351
TORSIONAL VIBRATION DAMPER
Filed Jan. 5, 1938   2 Sheets-Sheet 2
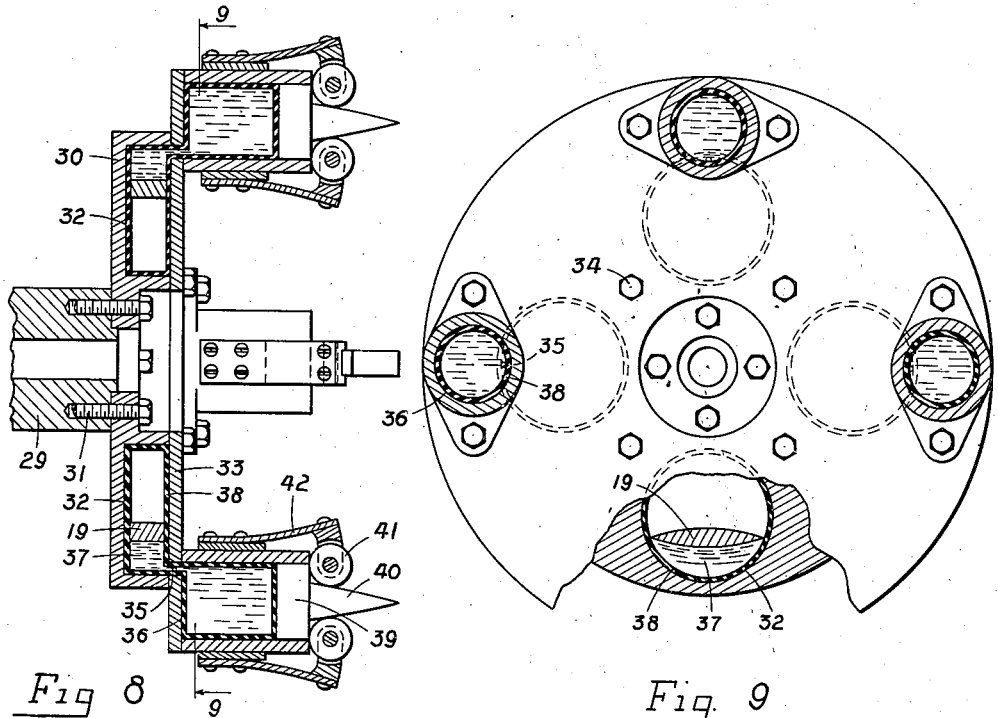
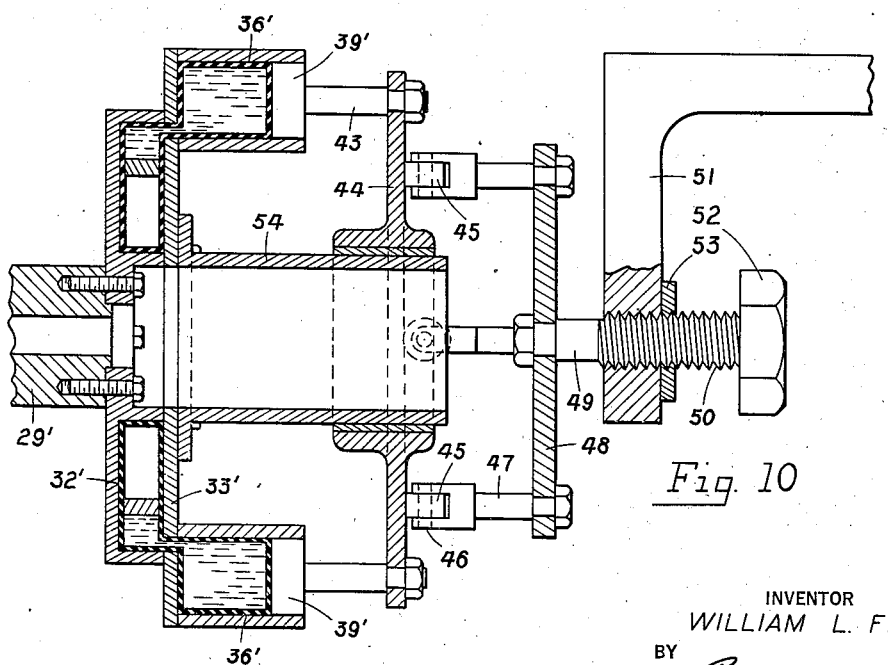
INVENTOR
WILLIAM L. FISCHER
BY
ATTORNEY Patented Nov. 21, 1939

2,180,351

UNITED STATES PATENT OFFICE 2,180,351

TORSIONAL VIBRATION DAMPER

William L. Fischer, Philadelphia, Pa.

Application January 5, 1938, Serial No. 183,493

14 Claims. (Cl. 74—604)

(Granted under the act of March 3, 1883, as amended April 30, 1928; 370 O. G. 757)

This invention relates to a torsional vibration damper, and has for an object to provide an improved torsional vibration damper useful both in dampening the vibration of shafts whose harmonics have but a single dangerous node, and for shafts whose harmonics have several dangerous nodes.

A further object of this invention is to provide a torsional vibration damper of the resonance pendulum type, whose tuning can be calculated for application in an engine whose harmonics have a single dangerous node and whose tuning can be varied at will, either automatically or manually, during the operation of an engine, if desired.

A still further object of this invention is to provide a noiseless vibration damper, inasmuch as a liquid pendulum is noiseless.

Still a further object of this invention is to provide a resonance pendulum damper which is not a solid mass or a rigid mass such as set forth in U. S. Patent No. 2,029,796, but is a liquid mass, preferably mercury, which liquid mass may either be a fixed amount in a hermetically sealed cartridge or may be a variable amount, depending upon the speed of rotation of the shaft, and the mass may be so installed that the amount may be varied automatically according to the speed of rotation of the shaft, or may be varied manually. The supporting part to which this invention may apply may be either an existing part of the shaft such as a flywheel, a crankcheek, a counterweight, or may be any especially designed member for the purpose of holding it.

With the foregoing and other objects in view, the invention consists in the construction, combination and arrangement of parts hereinafter described and illustrated in the drawings, in which:

Fig. 8 is a sectional view of an application of the invention wherein the tuning is automatically varied;

Fig. 9 is a view partly broken away on line 9—9 of Fig. 8; and

Fig. 10 shows an application of this invention, wherein the tuning may be manually adjusted.

Figures 1, 2, 3:
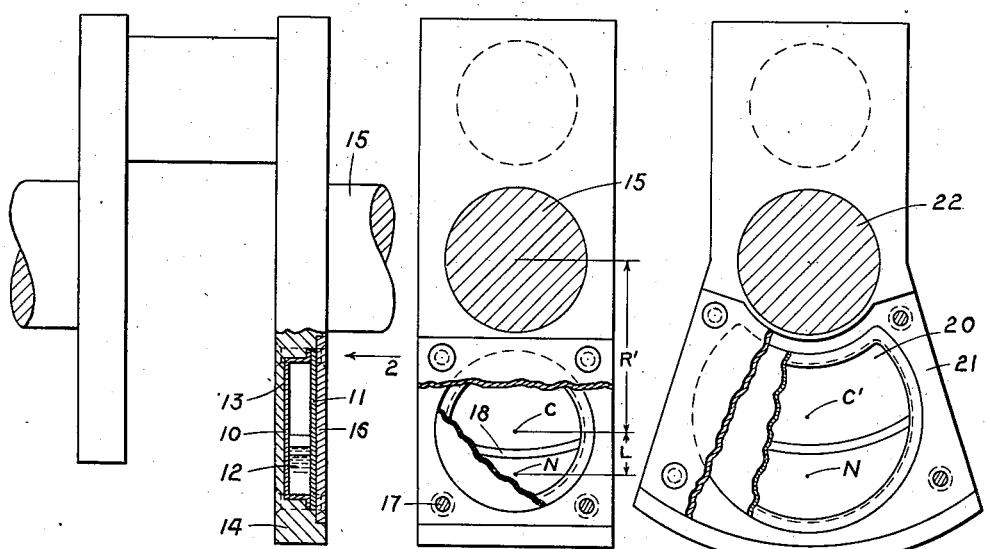
Fig. 1 is a fragmentary elevational view of a crankshaft and a crankcheek, partly in section, to which this invention has been applied.
Fig. 2 is a side elevational view looking in the direction of arrow 2 of Fig. 1.
Fig. 3 is a view similar to Fig. 2, having an enlarged crankcheek or counterweight and including a slightly modified form of this invention.

There is shown at 10 a cartridge which includes a cover 11 hermetically sealed thereto as by welding, and contains a quantity of mercury 12. As shown in Figs. 1 and 2, this cartridge 10 may be placed within a recess 13 located within a crankcheek 14 of a crankshaft 15, whose torsional vibration is to be damped thereby, a cover 16 being riveted over the recess 13 as at 17, to hold the cartridge permanently in position. In this partly filled cartridge 10 of the liquid mass 12 can swing like a pendulum; that means it can move within the cartridge in such a way that its center of gravity N (note that this means the center of gravity of the mass when the shaft 15 is rotating) moves in an arc around the point C whose distance $R^1$ from the axis of rotation is fixed and constant. The cartridge design and the mercury in the cartridge is chosen so that the following basic formula is fulfilled:

$$L = \frac{R'}{H^2}$$

where

L=distance of the center of gravity N of the mercury mass 12 (when the shaft rotates) from the center C of the cavity 13, or from the center C' of the cylindrical lower portion of the alternative cavity in Fig. 3.

R'=distance of C or C' from the axis of rotation of the shaft.

H=number of vibrations for each revolution of the shaft, which the damper is designed to combat.

By utilizing mercury as the liquid mass, tuning can be accomplished within a smaller radius, and hence the cartridge may be included within the crankcheek of an internal combustion engine within a smaller space than is normally available. The material of the cartridge must be chosen so that there will be no chemical reaction between the mercury and the cartridge. One satisfactory material is the nickel alloy commercially known as Monel metal. A second material may be placed within the cartridge to float on top of the mercury to prevent or dampen excessive surface waves thereof. This second material may be a liquid as at 18, of low specific gravity and of high viscosity, for example, castor oil, or it may be a solid float shaped such as shown at 19 in Fig. 7.

While the cartridge 10 has been shown as being circular in outline, it need not be completely circular so long as it fulfills the requirements of the above formula, but it may be somewhat irregular as shown at 20 within the enlarged crankcheek and counterweight 21 of the crankshaft 22, in Fig. 3.

Instead of applying the cartridge 10 to a crankcheek or counterweight it may be applied to a flywheel 23 keyed to the crankshaft 24 as at 25, although it will be understood that it may be applied both to the crankshaft and to the flywheel.

Figure 5:
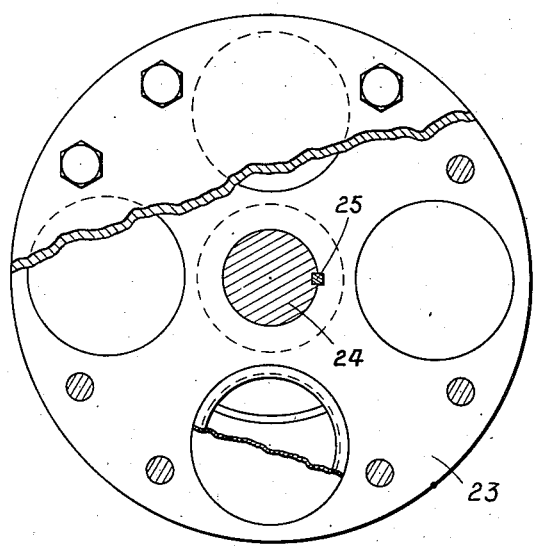
Fig. 5 is a front elevational view, partly broken away, looking in the direction of arrow 5 on Fig. 4.
Figure 4:
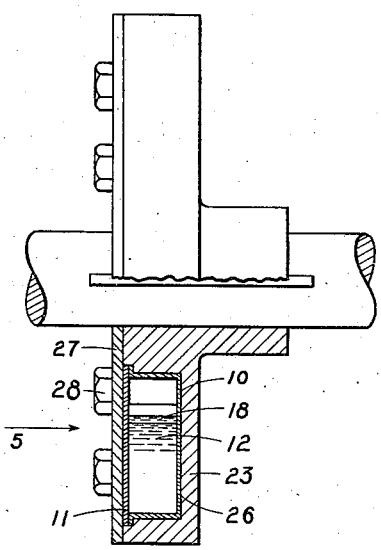
Fig. 4 is a side elevational view, partly in section, of a flywheel to which this invention has been applied.

As shown here in Figs. 4 and 5, the flywheel 23 is provided with a plurality of recesses 26, in each of which cartridge 10 has been placed and held in position by a cover or plate 27 secured to the flywheel 23 by means of stud bolts 28.

In Figs. 8 and 9 the principles of this invention are shown as applied to a flywheel, wherein the tuning may be automatically varied in accordance with the speed of rotation of the shaft 29 to which the flywheel 30 is secured as by bolts 31. This flywheel 30 has a plurality of chambers 32. A cover plate 33 held on flywheel 30 by bolts 34 closes the chamber 32, except for a passageway 35 extending to a reserve chamber 36. The mercury 37 is sealed within the chamber 32, passageway 35 and reserve chamber 36 by being contained within a sealed, thin walled rubber bag 38, this bag 38 being preferably made of artificial rubber, which is more heat and oil resisting than is natural rubber.

Figures 6, 7:
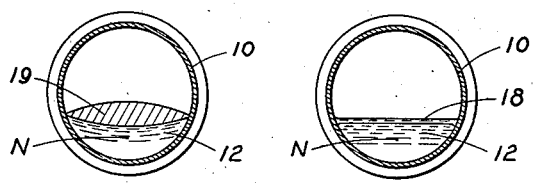
Fig. 6 is a sectional view of a cartridge utilizing this invention, the liquid being shown at rest with a liquid wave damper thereon.
Fig. 7 is a view similar to Fig. 6 with the liquid in the position assumed during operation, with a rigid wave damper thereon.

As shown in Fig. 9, the chamber 32 is generally circular so that the mercury 37 contained therein will act the same as in the form shown in Figs. 6 and 7, and may be provided with a similar excessive wave preventing member, such as at 19. The reserve chamber 36 is in the form of a cylinder having a movable outside wall or piston 39, provided with a cam or wedge 40 against which operate a pair of rollers 41 on spring arms 42 pressing thereagainst.

In operation in this form the amount of mercury within the chamber 32 will decrease as the speed of rotation increases, for centrifugal force will cause the mercury in chamber 32 to go through the passageway 35 to the reserve chamber 36, its action therein being resisted and finally limited by the spring arms 42 against the cam 40 on wall or piston 39.

As shown in Fig. 8, the shaft is being rotated at its intended maximum speed, for the piston 39 is at its outermost limit. At slower speeds the spring arms 42 will cause the piston 30 to press against the bag 38 and force some of the mercury through the passageway 35 into the operating chamber 32, so that at a slower speed of rotation the center of gravity of the mercury within chamber 32 will be closer to the center of rotation of the shaft 29, eliminating vibration in the shaft in accordance with the above formula.

In the form shown in Fig. 10, manual instead of automatic means is provided for forcing the mercury from the reserve chamber to the operating chamber. In this case the piston 39' is provided with a connecting rod 43, secured to the disc 44 journaled on a hub 54, affixed to the flywheel cover 33' and having the same axis of rotation as the shaft 29'. Longitudinal shifting of the disc 44 in the direction of the axis of shaft 29' will obviously have the same effect on reserve chamber 36' in this form as would the operation of the rollers 41 on cam 40 of piston 39 in the form of Figs. 8 and 9. The disc 44 may be shifted so as to force the pistons 39' into the reserve chambers 36' by means of bearings 45 journaled as at 46 at the end of feet 47 on a plate 48 having a control rod 49 threaded as at 50 through any fixed support 51, a control nuthead 52 being provided on the threaded control rod 50 for positioning it while a lock nut 53 may be thereafter tightened against support 51 to hold it in the selected position.

In operation, centrifugal force will cause the mercury to flow from the chamber 32' to the reserve chamber 36' until limited by the piston wall 39' which, in turn, is limited by abutment of disc 44 against the bearings 45.

Tuning of the harmonics of the shaft in question may thus be controlled according to the form of the invention selected. If the sealed cartridge is used its mass must be chosen so that the above formula is fulfilled, which formula is also considered in connection with the automatically variable mass of mercury in Figs. 8 and 9, or the manually variable mass of mercury in Fig. 10, a torsiograph being utilized as necessary to assist in determining the proper mass and the location thereof. By utilizing a liquid mass such as mercury instead of a rigid mass, a pendulum is provided whose length varies as the speed of rotation varies, for centrifugal force changes the shape of the mass within the cartridge during rotation of the shaft, thus changing its center of gravity.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. A vibration damper for a torque transmitting shaft having a substantially cylindrical recess formed with its axis parallel to but offset from the axis of rotation of said shaft, and a body of liquid partially filling said recess so as to have a single free surface extending continuously between opposed concave portions of the cylindrical surface of said recess and adapted to swing freely around the axis of said recess upon occurrence of a predetermined speed of said shaft.

2. The combination set forth in claim 1 further characterized in that said body of liquid is of such a volume that its center of gravity during rotation of said shaft lies "L" inches away from the axis of said recess, the distance "L" being defined by the formula $$L = \frac{R}{H^2}$$

wherein "R" is the distance between the axis of said recess and the axis of rotation of said shaft, and "H" is the number of vibrations occurring per one shaft revolution at said predetermined speed of said shaft.

3. The combination set forth in claim 1 further characterized in that said body of liquid is composed of a main liquid of high specific gravity but low viscosity and another liquid of low specific gravity but high viscosity floating as a layer on top of said main liquid so as to dampen excessive surface waves on said main liquid.

4. The combination set forth in claim 1 further characterized by the provision of a solid member having a specific gravity lower than that of said liquid body and floating on top thereof.

5. A torsional vibration damper of the resonance pendulum type comprising a liquid pendulum whose center of gravity varies from rest to rotation, and a material of a lighter specific gravity than the liquid mass floating thereon to prevent excessive wave motion, said floating material being liquid.

6. The combination set forth in claim 1 further characterized by the provision of a solid member, having a specific gravity lower than that of said liquid body and floating on top thereof, said solid member being shaped at least on the side thereof which contacts the liquid, so as to conform with the natural surface of the liquid when the same is under the action of centrifugal forces during rotation of said shaft.

7. A torsional vibration damper of the resonance pendulum type comprising a liquid pendulum whose center of gravity varies from rest to rotation, said liquid mass being contained within an operating chamber connected to the rotating member whose vibration is to be damped, and a reserve chamber and a passageway from said reserve chamber to said operating chamber.

8. A torsional vibration damper of the resonance pendulum type comprising a liquid pendulum whose center of gravity varies from rest to rotation, said liquid mass being contained within an operating chamber connected to the rotating member whose vibration is to be damped, and means for varying the mass within said operating chamber.

9. A torsional vibration damper of the resonance pendulum type comprising a liquid pendulum whose center of gravity varies from rest to rotation, said liquid mass being contained within an operating chamber connected to the rotating member whose vibration is to be damped, and means for varying the mass within said operating chamber, said means including a reserve chamber and a passageway connecting the reserve chamber to the operating chamber.

10. A torsional vibration damper of the resonance pendulum type comprising a liquid pendulum whose center of gravity varies from rest to rotation, said liquid mass being contained within an operating chamber connected to the rotating member whose vibration is to be damped, means for varying the mass within said operating chamber, said means including a reserve chamber and a passageway connecting the reserve chamber to the operating chamber, and automatic means for causing the liquid mass in the reserve chamber to enter the operating chamber according to the speed of rotation.

11. A torsional vibration damper of the resonance pendulum type comprising a liquid pendulum whose center of gravity varies from rest to rotation, said liquid mass being contained within an operating chamber connected to the rotating member whose vibration is to be damped, means including a reserve chamber and a passageway connecting the reserve chamber to the operating chamber, and manually controllable means for causing the liquid mass in the reserve chamber to enter the operating chamber as desired.

12. A torsional vibration damper of the resonance pendulum type comprising a liquid pendulum whose center of gravity varies from rest to rotation, said liquid mass being contained within an operating chamber connected to the rotating member whose vibration is to be damped, means for varying the mass within said operating chamber, said means including a reserve chamber and a passageway connecting the reserve chamber to the operating chamber, and a piston wall in the reserve chamber for forcing the liquid mass in the reserve chamber into the operating chamber.

13. A torsional vibration damper of the resonance pendulum type comprising a liquid pendulum whose center of gravity varies from rest to rotation, said liquid mass being contained within an operating chamber connected to the rotating member whose vibration is to be damped, means for varying the mass within said operating chamber, said means including a reserve chamber and a passageway connecting the reserve chamber to the operating chamber, a piston wall in the reserve chamber for forcing the liquid mass in the reserve chamber into the operating chamber, and a yieldable means urging said piston wall against the liquid mass in the reserve chamber.

14. A torsional vibration damper of the resonance pendulum type comprising a liquid pendulum whose center of gravity varies from rest to rotation, said liquid mass being contained within an operating chamber connected to the rotating member whose vibration is to be damped, means for varying the mass within said operating chamber, said means including a reserve chamber and a passageway connecting the reserve chamber to the operating chamber, a piston wall in the reserve chamber for forcing the liquid mass in the reserve chamber into the operating chamber, and manually controllable means for urging said piston wall against the liquid mass in the reserve chamber to force it into the operating chamber.

WILLIAM L. FISCHER.